United States Patent [19]

Fasciati et al.

[11] Patent Number: 4,558,121
[45] Date of Patent: Dec. 10, 1985

[54] SULFOETHYLAMINOSULFONYL SUBSTITUTED DISAZO DYES

[75] Inventors: Alfred Fasciati, Bottmingen; Arthur Bühler, Rheinfelden, both of Switzerland

[73] Assignee: Ciba Geigy Corporation, Ardsley, N.Y.

[21] Appl. No.: 199,790

[22] Filed: Oct. 23, 1980

Related U.S. Application Data

[63] Continuation of Ser. No. 932,972, Aug. 11, 1978, abandoned.

[30] Foreign Application Priority Data

Aug. 22, 1977 [LU] Luxembourg ............................ 78008
Aug. 22, 1977 [LU] Luxembourg ............................ 78007

[51] Int. Cl.$^4$ ..................... C09B 35/26; C09B 62/83; D06P 3/24; D06P 3/26
[52] U.S. Cl. .................................. 534/641; 534/591; 534/734; 534/797; 534/817
[58] Field of Search ............... 260/152, 153, 175, 177, 260/178, 187, 186; 534/641, 817, 734

[56] References Cited

U.S. PATENT DOCUMENTS 1,538,934  5/1925  Geller ................................. 260/175
3,657,218  4/1972  Gnad ................................. 260/175
3,709,870  1/1973  Wolfrum ............................. 260/186
3,951,944  4/1976  Fuchs ................................. 260/186

OTHER PUBLICATIONS

Siegel, E., "The Chemistry of Synthetic Dyes," vol. VI, pp. 53-69, (See pp. 53-54 and 59-60).

Primary Examiner—Floyd D. Higel
Attorney, Agent, or Firm—Edward McC. Roberts; Kevin T. Mansfield

[57] ABSTRACT

The invention provides novel symmetrical and unsymmetrical disazo dyes which in the form of the free acid have the formula I

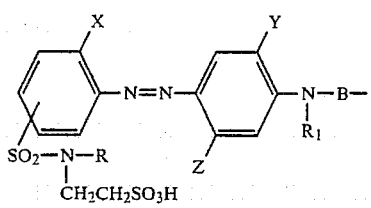

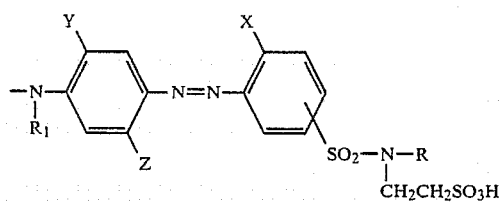

wherein
each R independently of the other represents hydrogen or an alkyl group of 1 to 4 carbon atoms,
each $R_1$ independently of the other represents hydrogen, the methyl, ethyl, hydroxyethyl or cyanoethyl radical, but especially hydrogen,
each X independently of the other represents hydrogen, halogen, an alkyl or alkoxy group, each of 1 to 4 carbon atoms,
each Y independently of the other represents hydrogen or an alkoxy group of 1 to 4 carbon atoms,
each Z independently of the other represents hydrogen, an acylamino group or an alkyl or alkoxy group, each of 1 to 4 carbon atoms, and
B represents an acyl radical.

7 Claims, No Drawings

SULFOETHYLAMINOSULFONYL SUBSTITUTED DISAZO DYES

This is a continuation of application Ser. No. 932,972 filed on Aug. 11, 1978 now abandoned.

The invention provides novel symmetrical and unsymmetrical disazo dyes which in the form of the free acid have the formula I

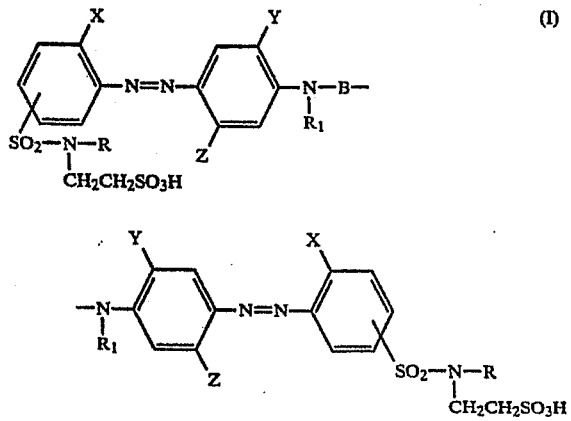

wherein each R independently of the other represents hydrogen or an alkyl group of 1 to 4 carbon atoms, each $R_1$ independently of the other represents hydrogen, the methyl, ethyl, hydroxyethyl or cyanoethyl radical, but especially hydrogen, each X independently of the other represents hydrogen, halogen, an alkyl or alkoxy group, each of 1 to 4 carbon atoms, each Y independently of the other represents hydrogen or an alkoxy group of 1 to 4 carbon atoms, each Z independently of the other represents hydrogen, an acylamino group or an alkyl or alkoxy group, each of 1 to 4 carbon atoms, and B represents an acyl radical, a process for the production thereof and a process for dyeing and printing natural or synthetic nitrogen-containing textile material with the novel dyes, as well as the natural or synthetic nitrogen-containing textile material dyed or printed therewith.

The $C_1-C_4$alkyl group R is a straight chain or branched alkyl group, for example the methyl or ethyl group and the straight or branched propyl group. In preferred disazo dyes, R is hydrogen.

Halogen represented by X can be both fluorine, chlorine or bromine. The $C_1-C_4$alkyl group X is both a straight chain or branched alkyl group, such as the methyl, ethyl, n-propyl and isopropyl group or the n-butyl, sec-butyl and tert-butyl radical. X as a $C_1-C_4$alkoxy group of 1 to 4 carbon atoms is for example the methoxy, ethoxy, propoxy or butoxy group.

Y as a $C_1-C_4$alkoxy group is for example the methoxy, ethoxy, propoxy or butoxy group. In preferred disazo dyes of the formula I, Y is the methoxy group.

Z as an acylamino group is for example the group of the formula $-NHCO-R_2$, wherein $R_2$ represents an aliphatic radical, such as the methyl or ethyl radical. Z as a $C_1-C_4$alkyl or $C_1-C_4$alkyl or $C_1-C_4$alkoxy group is for example a straight chain or branched alkyl group, such as the methyl, ethyl, n-propyl and isopropyl group, or the methoxy, ethoxy and propoxy group. In preferred disazo dyes, Z is hydrogen.

The acyl radical B can be both aromatic and aliphatic or heterocyclic.

Possible aromatic radicals B are radicals of the benzene or naphthalene series, for example the 1,3- or 1,4-benzenedicarboxylic acid radical, the nitroterephthalic acid radical or the 1,4- or 2,6-naphthalenedicarboxylic acid radical.

Preferably, B is an aliphatic or heterocyclic acyl radical and represents for example the carbonyl or thiocarbonyl radical, the radical of an aliphatic or heterocyclic dicarboxylic dihalide, such as $-CO-CH=CH-CO-$ or

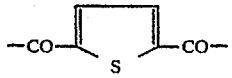

or the radical of a diazine or triazine compound, such as

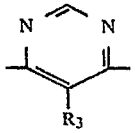

wherein $R_3$ can be hydrogen or a non-ionogenic substituent, for example an alkoxy group or an amino group, or

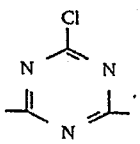

In preferred disazo dyes, B represents the carbonyl radical, as these dyes are particularly easy to obtain.

Particularly interesting disazo dyes as regards their good wetfastness properties, especially on polyamide material, are symmetrical disazo dyes of the formula I, in particular those which in the form of the free acid have the formula Ia

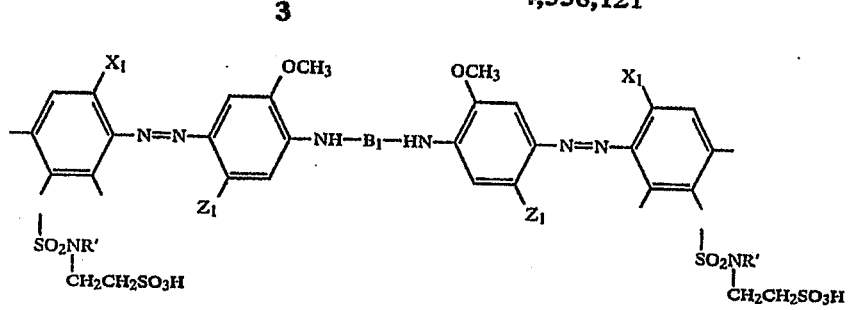

wherein $X_1$ represents hydrogen, methoxy or chlorine, $Z_1$ represents hydrogen, methyl or methoxy, $R'$ represents hydrogen or methyl, and $B_1$ represents carbonyl, thiocarbonyl,

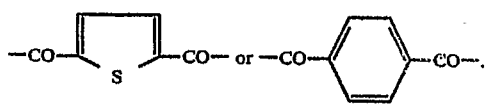

Interesting disazo dyes are also those of the formula Ib

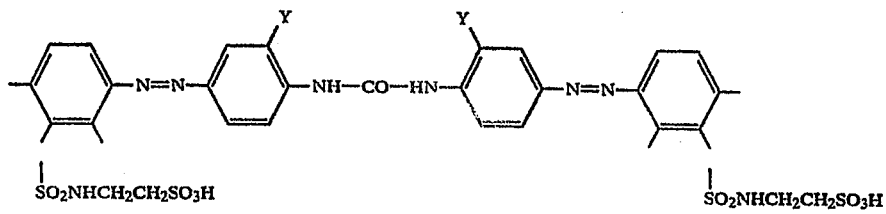

wherein each Y represents an alkoxy group of 1 to 4 carbon atoms, especially the methoxy group, and those of the formula Ic

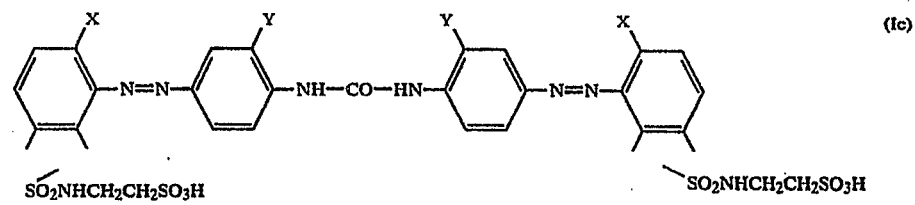

wherein X and Y are as defined in formula I, in particular those wherein X represents halogen or an alkoxy group of 1 to 4 carbon atoms, especially chlorine and methoxy, and Y also represents an alkoxy group of 1 to 4 carbon atoms, especially methoxy.

Finally, preferred symmetrical disazo dyes are also those of the formula Id

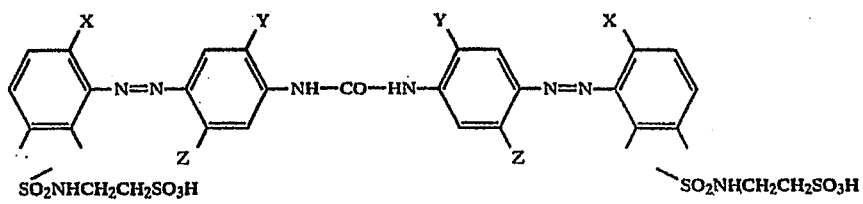

wherein X, Y and Z are as defined in formula I, in particular those wherein X represents halogen or an alkoxy group of 1 to 4 carbon atoms, Y also represents an alkoxy group of 1 to 4 carbon atoms, and Z has the meaning given in formula I; and especially those disazo dyes wherein X represents chlorine or the methoxy group, Y represents the methoxy group and Z represents the methoxy, methyl or $NHCOCH_3$ group and, in particular, hydrogen.

The novel disazo dyes of the formula I can be obtained by methods which are known in the art for the production of disazo dyes. One method consists for example in reacting 2 moles of the same aminoazo compound of the formula II, or 1 mole of each of two different aminoazo compounds of the formula II

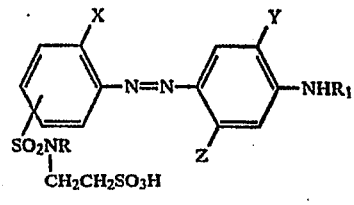

wherein R, $R_1$, X, Y and Z have the meanings given in formulae I, Ia, Ib and Ic, with 1 mole of an acylating agent which introduces the radical B.

Another process variant consists in reacting a symmetrical or unsymmetrical disazo dye of the formula III

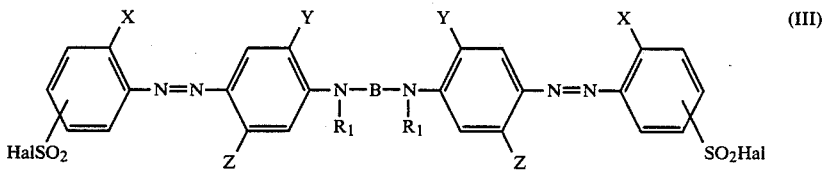

wherein Hal represents a halogen atom, especially a chlorine atom, and X, Y, Z, $R_1$ and B have the given meanings, with an aminoethanesulphonic acid of the formula $HNRCH_2CH_2SO_3H$, wherein R has the given meaning, in water and in the presence of an alkali hydroxide or alkali carbonate.

The aminoazo compounds of the formula II are known for example from German Offenlegungsschrift No. 2,159,216. These compounds are obtained by diazotising in known manner for example a diazo component which in the form of the free acid has the formula

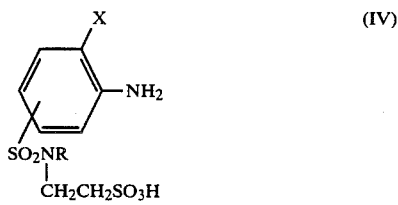

wherein R and X have the given meanings, and subsequently coupling the diazonium compound with an aromatic amine or the corresponding ω-methanesulphonic acid, which both couple in the para-position to the amino group and have the general formula V

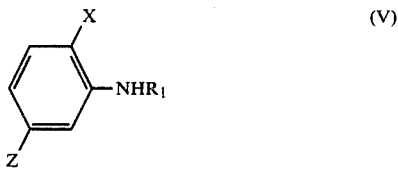

wherein X, Z and $R_1$ have the given meanings, and removing the methylenesulphonyl radical by hydrolysis.

The diazo compounds of the formula IV, which are also known, are in turn obtained for example by reacting aminobenzenesulphonyl chlorides, in which the amino group is in protected or masked form, with aminoethanesulphonic acid or N—($C_1$-$C_4$)alkylaminoethanesulphonic acid, in water in the presence of an alkali hydroxide or alkali carbonate.

The coupling of the diazo components of the formula IV with the compounds of the formula V to give the aminoazo compounds of the general formula II is carried out in a strongly acid to weakly acid pH range at temperatures from 0° to 40° C.

Examples of aminoazo compounds which are used for the reaction are:

1-amino-2-methoxy-5-methyl-azobenzene-3'-sulphonic acid (N-β-sulphoethyl)-amide, 1-amino-2-methoxy-5-methyl-azobenzene-2'-sulphonic acid (N-β-sulphoethyl)-amide, 1-amino-2,2',5-trimethoxy-azobenzene-5'-sulphonic acid (N-β-sulphoethyl)-amide, 1-amino-2,5-dimethoxy-azobenzene-2'-sulphonic acid (N-β-sulphoethyl)-amide, 1-amino-2-methoxy-azobenzene-4'-sulphonic acid (N-β-sulphoethyl)-amide, 1-amino-2,2'-dimethoxy-azobenzene-5'-sulphonic acid (N-β-sulphoethyl)-amide and 1-amino-2-methoxy-azobenzene-4'-sulphonic acid (N-methyl-N-β-sulphoethyl)-amide.

The acylation of the aminoazo compound of the formula III with the acylating agent which introduces the radical B is effected in a manner which is known per se, for example as described in Ullmanns Encyclopädie der technischen Chemie, Vol. 3 (1953), pp. 87–92.

Suitable acylating agents which introduce the group B are for example: phosgene, thiophosgene, aliphatic and heterocyclic dicarboxylic dihalides, such as oxalyl dichloride, succinyldichloride and thiophene 2,5-dicarboxylic acid dichloride, and diazine and triazine compounds which contain at least two reactive leaving groups, such as halodiazines and halotriazines, in particular cyanuric chloride, and also dichloro- or dibromotriazines, aromatic dicarboxylic acid dihalides, such as 1,3- or 1,4-benzenedicarboxylic acid dichloride and 1,4- or 2,6-naphthalenedicarboxylic acid dichloride.

The novel disazo dyes of the formula I are yellow to scarlet dyes and the dyeings obtained therewith on natural or synthetic nitrogen-containing textile material are distinguished by very good fastness properties, especially by very good lightfastness and wetfastness, for example washfastness and fastness to perspiration, as well as by a good build-up and thermochromatic behaviour. Very level dyeings are obtained with these dyes.

The novel disazo dyes of the formula I are used for dyeing and printing a very wide range of natural and synthetic nitrogen-containing textile materials, such as fibres, filaments and wovens, especially of wool, silk, polyamide or polyurethane material.

These materials are dyed from an acid to neutral bath at temperatures between about 80° and 120°, preferably at around 100° C., and using the assistants conventionally employed in dyeing or printing.

In the following illustrative, but nonlimitative Examples, the parts and percentages are by weight unless otherwise stated. The dyes or intermediates can be in the form of free acids or the alkali metal salts thereof,

EXAMPLE 1

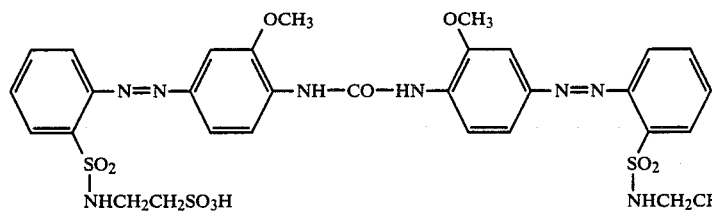

28 parts of 1-aminobenzene-2-sulphonic acid N-(β-sulphoethyl)amide are dissolved in 250 parts of water with the addition of 21 parts by volume of 30% aqueous HCl and, after the addition of ice, diazotised at 0° to 5° C. with 25 parts by volume of 4N sodium nitrite. When the nitrite reaction is complete, the diazo solution is adjusted to about pH 2.5 by sprinkling in sodium bicarbonate. Then 6.6 parts of sodium acetate crystals are added and immediately 21.7 parts of o-anisidine-Ω-methanesulphonic acid are sprinked in. The coupling is complete after stirring for 1 hour at 5° to 8° C. Saponification is effected by adding 38 parts of sodium hydroxide and boiling for 90 minutes. The orange solution is adjusted to pH 7 with conc. hydrochloric acid, heated to 50° C., and phosgene is introduced until the starting material is no longer detectable. The pH is kept at 7 by addition of sodium hydroxide solution. When the condensation is complete, 150 parts of solid sodium chloride are added to the yellow solution. The precipitated disazo dye of the above formula is collected by filtration, washed with a small amount of sodium chloride solution and dried at 70° to 80° C., affording 43.8 parts of a reddish brown powder which forms a yellow solution in water and a violet solution in conc. hydrochloric acid and dyes polyamide fibres from a weakly acid bath in bright golden yellow shades of excellent fastness properties. Disazo dyes which dye polyamide in the shades indicated in column V of the following table are obtained by repeating the procedure of this Example, but using instead of the saponified coupling product of 1-aminobenzene-2-sulphonic acid (N-β-sulphoethyl)amide and o-anisidine-Ω-methanesulphonic acid, equivalent amounts of the coupling products of columns II and IV and condensing these with the acylating agents of column III.

TABLE

| I Example | II Coupling product | III Acylating agent | IV Coupling product | V Shade on polyamide |
|---|---|---|---|---|
| 2 | (structure) | Cl-CO-Cl | (structure) | golden yellow |
| 3 | (structure) | " | (structure) | scarlet |
| 4 | (structure) | " | (structure) | orange |
| 5 | (structure) | " | (structure) | golden yellow |

TABLE-continued

| I Example | II Coupling product | III Acylating agent | IV Coupling product | V Shade on polyamide |
|---|---|---|---|---|
| 6 | (structure) | " | (structure) | yellow |
| 7 | (structure) | (structure with ClCO—S—COCl) | (structure) | yellow |
| 8 | (structure) | Cl–CO–Cl | (structure) | golden yellow |
| 9 | " | CSCl₂ | " | golden yellow |
| 10 | (structure) | COCl₂ | (structure) | yellow |
| 11 | (structure) | " | (structure) | golden yellow |

EXAMPLE 12

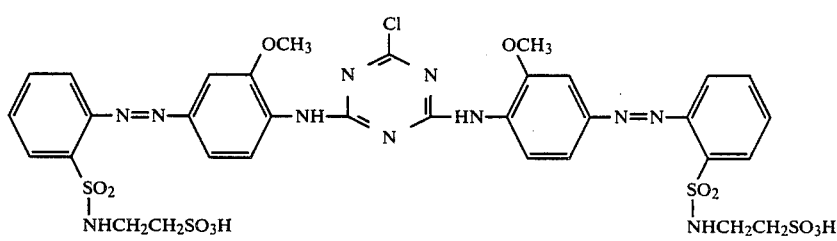

28 parts of 1-aminobenzene-2-sulphonic acid N-(β-sulphoethyl)amide are dissolved in 250 parts of water with the addition of 21 parts by volume of 30% aqueous HCl and, after the addition of ice, diazotised at 0° to 5° C. with 25 parts by volume of 4N sodium nitrite. When the nitrite reaction is complete, the diazo solution is adjusted to about pH 2.5 by sprinkling in sodium bicarbonate. Then 6.6 parts of sodium acetate crystals are added and immediately 21.7 parts of o-anisidine-Ω-methanesulphonic acid are sprinked in. The coupling is complete after stirring for 1 hour at 5° to 8° C. Saponification is effected by adding 38 parts of sodium hydroxide and boiling for 90 minutes. The orange solution is adjusted to pH 7 with conc. hydrochloric acid, cooled to 10°–12° C. and divided into two equal parts. With good stirring, 9.3 parts of finely divided cyanuric chloride are added to the first part and pH is kept at around 10 to 12 for about 30 minutes by addition of 2N sodium hydroxide solution. Then the second half of the solution is added and the batch is warmed to 35° to 40° C. while again keeping the pH at 7.

When the condensation is complete, 150 parts of solid sodium chloride are added to the yellow solution. The precipitated disazo dye of the above formula is collected by filtration, washed with a small amount of sodium chloride solution and dried at 70° to 80° C., affording a reddish brown powder which forms a yellow solution in water and a violet solution in conc.

EXAMPLE 13

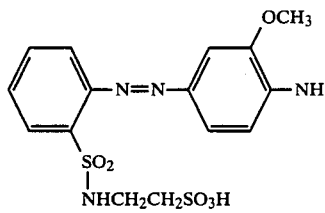

28 parts of 1-aminobenzene-2-sulphonic acid N-(β-sulphoethyl)amide are dissolved in 250 parts of water with the addition of 21 parts by volume of 30% aqueous HCl and, after the addition of ice, diazotised at 0° to 5° C. with 25 parts by volume of 4N sodium nitrite. When the nitrite reaction is complete, the diazo solution is adjusted to about pH 2.5 by sprinkling in sodium bicarbonate. Then 6.6 parts of sodium acetate crystals are added and immediately 21.7 parts of o-anisidine-Ω-methanesulphonic acid are sprinked in. The coupling is complete after stirring for 1 hour at 5° to 8° C. Saponification is effected by adding 38 parts of sodium hydroxide and boiling for 90 minutes. The orange solution is adjusted to pH 7 with conc. hydrochloric acid, heated to 50° C., and then 20.3 parts of benzene-1,4-dicarboxylic acid dichloride. The pH is kept at 7 by addition of sodium hydroxide solution. When the condensation is complete, 150 parts of solid sodium chloride are added. The precipitated disazo dye of the above formula is collected by filtration, washed with a small amount of sodium chloride solution and dried at 70° to 80° C., affording 43.8 parts of a red powder which forms a yellow solution in water and a violet solution in conc. hydrochloric acid and dyes polyamide fibres from a weakly acid bath in bright golden yellow shades of excellent fastness properties.

EXAMPLE 14

A piece of polyamide fabric (10 g) is dyed for 60 minutes at 100° C. in an aqueous liquor of about pH 6 containing an aqueous buffer solution of mono- and disodium phosphate and 2% by weight of the dye of Example 1, based on the weight of the fabric. The piece of polyamide is subsequently removed from the bath and washed and dried in the conventional manner. A golden yellow dyeing of good wetfastness and lightfastness is obtained.

What is claimed is:

1. A disazo dye which in the form of the free acid has the formula I

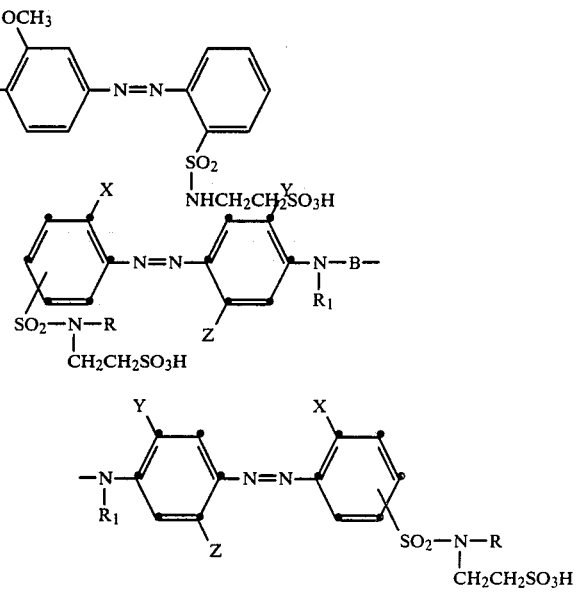

wherein
  each R independently of the other represents hydrogen or alkyl of 1 to 4 carbon atoms,
  each $R_1$ independently of the other represents hydrogen, methyl, ethyl, hydroxyethyl or cyanoethyl,
  each X independently of the other represents hydrogen, halogen, or alkyl or alkoxy each of 1 to 4 carbon atoms,
  each Y independently of the other represents hydrogen or alkoxy of 1 to 4 carbon atoms,
  each Z independently of the other represents hydrogen, acylamino or alkyl or alkoxy each of 1 to 4 carbon atoms, and
  B represents carbonyl or thiocarbonyl.

2. A symmetrical disazo dye of claim 1 which in the form of the free acid has the formula

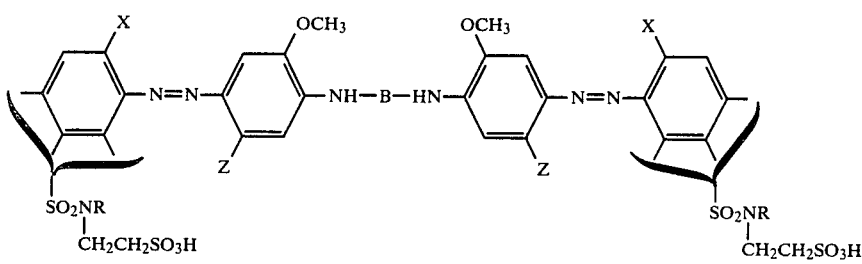

wherein
  X represents hydrogen, methoxy or chloro;
  Z represents hydrogen, methyl or methoxy;
  R represents hydrogen or methyl; and
  B represents carbonyl or thiocarbonyl.

3. A symmetrical disazo dye according to claim 2 wherein X is hydrogen, Z is hydrogen, R is hydrogen and B is carbonyl.

4. A symmetrical disazo dye according to claim 2, wherein X is chloro or methoxy, Z is hydrogen, R is hydrogen and B is carbonyl.

5. A symmetrical disazo dye of claim 2, wherein R is hydrogen.

6. A symmetrical disazo dye of claim 5, wherein X is methoxy or chloro.

7. A symmetrical disazo dye of claim 6, wherein Z is hydrogen.

* * * * *